United States Patent
Monnerat et al.

(10) Patent No.: US 7,595,750 B2
(45) Date of Patent: Sep. 29, 2009

(54) SYSTEM AND METHOD FOR IMPROVING GPS SIGNAL PROCESSING IN A MOBILE PHONE BY USING MEMS

(75) Inventors: Michel Monnerat, L'Union (FR); Bruno Lobert, Pechabou (FR)

(73) Assignee: Alcatel Lucent, Paris (FR)

( * ) Notice: Subject to any disclaimer, the term of this patent is extended or adjusted under 35 U.S.C. 154(b) by 105 days.

(21) Appl. No.: 11/813,194

(22) PCT Filed: Nov. 18, 2005

(86) PCT No.: PCT/EP2005/056073

§ 371 (c)(1),
(2), (4) Date: Jul. 10, 2007

(87) PCT Pub. No.: WO2006/069852

PCT Pub. Date: Jul. 6, 2006

(65) Prior Publication Data

US 2008/0143596 A1    Jun. 19, 2008

(30) Foreign Application Priority Data

Dec. 31, 2004 (EP) .................................. 04293178

(51) Int. Cl.
*G01S 1/00* (2006.01)
*G01S 3/02* (2006.01)
(52) U.S. Cl. .................. 342/357.06; 342/457
(58) Field of Classification Search ............ 342/357.06, 342/457
See application file for complete search history.

(56) References Cited

U.S. PATENT DOCUMENTS

| 5,477,228 | A | 12/1995 | Tiwari |
| 6,061,021 | A | 5/2000 | Zibell |
| 6,259,400 | B1 | 7/2001 | Higgins |
| 6,750,814 | B1 | 6/2004 | Nir |
| 6,879,875 | B1 * | 4/2005 | Hu et al. ..................... 700/213 |
| 2003/0100313 | A1 * | 5/2003 | Ogino et al. ................ 455/456 |
| 2004/0150557 | A1 * | 8/2004 | Ford et al. ............. 342/357.14 |

FOREIGN PATENT DOCUMENTS

| EP | 0 462 648 A2 | 12/1991 |
| JP | 10 020016 | 1/1998 |

* cited by examiner

*Primary Examiner*—Thomas H Tarcza
*Assistant Examiner*—Harry Liu
(74) *Attorney, Agent, or Firm*—Fay Sharpe LLP

(57) ABSTRACT

A receiver (R) for use in a user mobile terminal (U) in a satellite positioning system having a constellation of satellites (S) in which the receiver (R) acquires data from a satellite related to the position of the mobile terminal (U). A MEMS device (M) is incorporated in the receiver (R) and is adapted for detecting the absolute value ($\hat{V}_u$) of the speed of the mobile terminal (U) and subsequently providing said value to the receiver (U). Means are provided for computing, by or for the receiver (R), the value corresponding to the vector components ($V_{ux}$, $V_{uy}$, $V_{uz}$) of the speed of the mobile terminal which in turn make possible the Doppler effect related to the users speed is obtained.

9 Claims, 1 Drawing Sheet

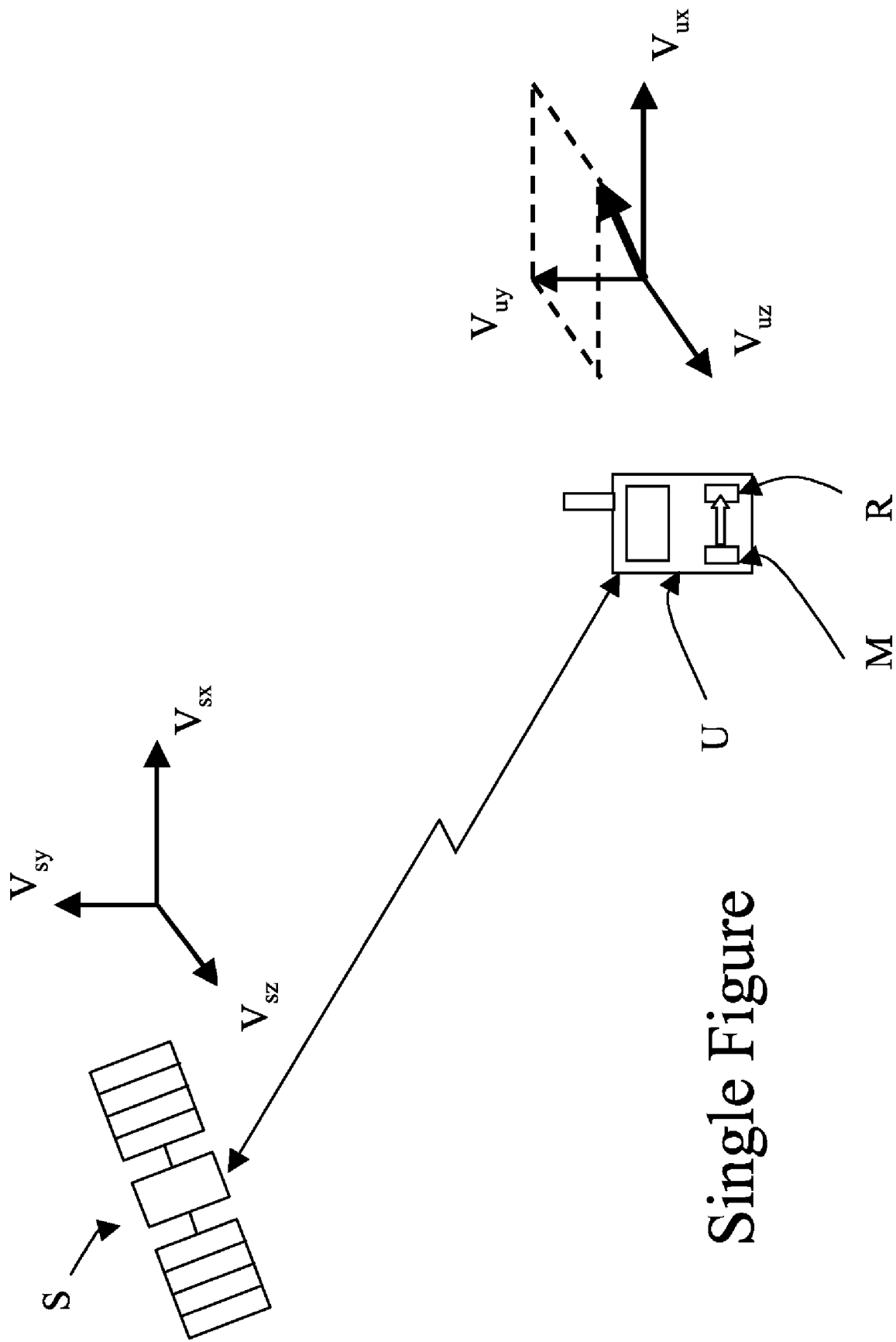
Single Figure

SYSTEM AND METHOD FOR IMPROVING GPS SIGNAL PROCESSING IN A MOBILE PHONE BY USING MEMS

The present invention relates to positioning of a mobile terminal. More particularly the invention relates to positioning of a mobile terminal by obtaining information on the speed of the mobile terminal while in movement using microelectromechanical sensors (hereinafter MEMS) on the one hand, and employing the information thus obtained in a positioning processing operation used in a satellite positioning system such as the processings according to the Global Positioning System or the Galileo positioning system.

BACKGROUND OF THE INVENTION

Among the variety of services available in the wireless communication systems in general, and mobile communication systems in particular, one which has recently acquired increasing importance is that of efficiently locating the position of a wireless or mobile terminal. By the terms "mobile terminal" it is meant to cover the broadest sense of such terminals such as any of the different known categories of terminals in cellular phone systems such as GSM, GPRS or UMTS, equipment capable of establishing wireless communication while in movement such as mobile computers or personal digital assistants or other similar devices, as well as other moving objects on land, air or sea such as cars, aircraft or ships respectively.

Among known techniques for providing such possibility of locating a mobile terminal, the Global Positioning System (hereinafter GPS) and the Galileo system are known. In the following description, for the sake of simplicity, reference is only made to GPS. Nevertheless it is noted that the invention is not be to be construed as being limited to this system but it can equally be used in other satellite positioning systems such as Galileo.

In very basic terms, GPS uses a constellation of satellites having known coordinates with respect to the Earth. Each of said satellites may transmit, in the form of a broadcast, signals containing information that can be used for determining the position of a mobile terminal. In order to be able to establish a location of the mobile terminal, the information transmitted is in fact received by the mobile terminal from various satellites. As GPS is a well-known technique in mobile terminal positioning applications, further and more detailed description thereupon is not considered necessary.

GPS however suffers from certain drawbacks in mobile terminal positioning procedures. One of such drawbacks is that different layers of atmosphere may introduce fluctuations in the signal transmitted from the satellite. Another problems is occasional lack of visibility of the satellite with respect to the mobile terminal. In the related art, "visibility" is considered to exist where a signal broadcast from a satellite can reach the mobile terminal without being blocked by any obstructing object on the transmission path. Therefore, if the mobile terminal is moved to a region where the visibility of the satellite is blocked, say by a tall building, signals may cease to reach the mobile terminal and thus the latter may not be able to acquire and process the data.

Another drawback associated with GPS applications is the Doppler effect which relates to a change in the frequency of the signal received by the mobile unit with respect to the initial frequency with which it was transmitted. As a consequence, Doppler effect causes certain problems in the accuracy of the received signal, and therefore gives rise to lack of precision in the positioning processing.

In order to overcome the above drawbacks, certain solutions are known. Generally, such solutions are directed to the use of an auxiliary station whose position is fixed and known and is capable of receiving the same signals from the satellite as that received by a mobile terminal in a relatively close vicinity. Therefore, in case of deterioration in the quality of the received signal (as mentioned above) a comparison can be made between the inaccurate results derived from the received signal and the exact position of the auxiliary station which is already known. From such comparison an error factor is obtained which is then transmitted to the mobile terminal. The mobile terminal, which also acquires and processes the same signals, can then take account of such error factor in its own processing of data in order to obtain a more accurate result.

However, this type of solutions suffer from the drawback that they increase the processing requirements in the mobile terminals thus occupying an important part of the resources of the mobile terminal which in turn give rise to an inefficient operation of the terminal.

A known solution to reduce the burden of processing the acquired data on the mobile terminal is the so-called Assisted-GPS (or AGPS). According to the solution provided by AGPS, part of the tasks of acquiring and processing the data broadcast by the satellite is performed in an "assistant" unit which is stationary. According to the solution provided by AGPS, the assistant unit acquires and processes data up to a certain level of completion which otherwise would have been acquired and processed by the mobile terminal. Although the assistant unit and the mobile terminal are not usually in the same area, the assistant unit does have knowledge of the approximate position of the mobile terminal and is capable of combining the information acquired by itself from the satellite with the information related to the approximate position of the mobile terminal and in this manner elaborate part of the information which is useful for being processed by the mobile terminal without the latter having to dedicate its own resources for obtaining the same results.

Although the assistant unit in AGPS systems reduces to a large extent the amount of data processing to be performed by the mobile unit, there still remains substantial processing requirements to be performed by the latter.

In order to better explain the need to reduce said data processing workload reference is again made to the basic data processing in a GPS system. One of the most complex phases in GPS data processing is the acquisition phase. The complexity is due to the nature of the GPS signal which is based on spread spectrum techniques. The acquisition is based on a time (phase) and frequency search of energy related to pseudo-random noise codes. A mobile terminal uses correlation techniques for searching these frequency and phase codes. Once a code is found the procedure is repeated in order to find further codes until all phase and frequency codes are searched and selected. The selection of codes involves an integration process which means a process of integrating each combination of the selected frequency and phase codes in the overall acquired data. As it can be appreciated, the overall searching and selecting procedure for a typical number of frequencies and phase shifts can involve a large number of operations.

The frequency search often suffers from several inaccuracy factors as follows:

instability in the receiver's local oscillator;
Doppler effect caused by the satellites;
Doppler effect caused by the user mobile terminal;

The first two effects are substantially eliminated if AGPS mode is employed which allows for obtaining assistance data as described above.

The third factor, namely the inaccuracy in user data is highly penalizing because it involves uncertainty in the frequency search while several frequency hypotheses have to be tested for the detection of signal energy. In fact, even when using APGS mode, in order to obtain a good benefit from the assistance data provided by the assistant unit, it is desirable to perform long coherent integration procedures, in the range of 20 ms. This implies the use of relatively very thin frequency slots in the frequency search. For a given frequency uncertainty, the energy research must be made on all the frequency slots which become more and more numerous as the slots become thinner, that is to say:

number of the slots=Total freq uncertainty/width of slots

On the other hand it is very difficult to have a priori information on the speed of the user and as a consequence on the user Doppler effect towards each satellite since it require the implementation of complex devices.

In a typical example of acquisition process, the speed of the satellite may be expressed as:

$$\vec{V}_s = (V_x, V_y, V_z);$$

and the induced Doppler may be expressed as:

$$\frac{f_0}{c}(\vec{V}_s \cdot \vec{u}),$$

where $f_0$ is the central frequency, e.g. 1576 MHz in the case of GPS; $\vec{u}$ is the unitary vector between the user and the satellite and c is the speed of light. In the case of AGPS, the frequency search is carried out already taking into account the satellite Doppler information. However, there exists the additional uncertainty caused by the user Doppler effect. This implies that the frequency search has to take into account deviation in the information due to said user Doppler effect which is given by the following expression:

$$\frac{f_0}{c}\vec{V}_u \cdot \vec{u},$$

where $\vec{V}_u$ is the user speed.

In the case of high sensitivity receivers, the acquisition is designed so that the coherent accumulation time (integration) is typically about 20 ms. The span of the frequency slots for searching is inversely proportional to the coherent integration value, namely:

$$\delta f = \frac{1}{2T_{coh}},$$

where Tcoh is the coherent integration duration value.

Therefore for a 20 ms integration time, the frequency slots used are 25 Hz. Supposing that a receiver of a user is moving, for example in a car, at a speed of 100 km/hr, i.e. 27 m/s approximately; the uncertainty due to the user Doppler effect would be approximately 270 Hz for low elevation satellites. This means that, for such a receiver moving horizontally, the acquisition is done over 11 frequency slots (270 user Doppler/ 25 slot) for satellites presenting a very low elevation angle. This clearly involves a large volume of operations imposed on the mobile terminal.

It is therefore desired to provide a solution according to which positioning data broadcast by a satellite in a GPS or AGPS system may be acquired by or for a mobile terminal in such a manner that the use of resources of the mobile terminal is minimized as much as possible.

DESCRIPTION OF THE INVENTION

The above objective is reached by using the solution proposed by the present invention according to which a conventional MEMS can be employed in order to obtain information related to the speed of the mobile terminal and this information is then used in the positioning data processing. More particularly the invention proposes the use of MEMS in obtaining information on the speed module of user (speed module meaning the absolute value of a vector that represents the speed of the user).

According to the invention, a receiver in a mobile terminal is provided with a simple MEMS capable of providing the module of the speed of the user. This information can be retrieved much more easily than the speed itself (three-dimensional vector) because it deals with an absolute value of the vector of speed and not the direction of the vector components of the speed. In this manner, during the acquisition phase the estimation of the speed of user would require less acquisition operations and thus the acquisition process is made easier.

In other words, when a number of satellites are acquired by a receiver, the Doppler factors with respect to these satellites are thus known. Furthermore, the position of these satellites are also known as they are provided to the receiver for instance by the data received from an assistant unit. Having the mentioned information, a system of equations for the projection of the speed on the line of sight of the satellites is created and the vector components of the speed are found. The obtained information is then used for calculating the Doppler effect of the user. For example if three satellites are acquired, there may thus be four equations, three of which are related to the acquisition of the three satellites and the forth equation is given by the module of the speed. From this system of equations, the vector components of the user speed and thus the Doppler towards all the other satellites of the constellations can be computed. This allows an important reduction in the complexity of the acquisition procedure.

Accordingly one object of the present invention is that of providing a receiver for use in a user mobile terminal in a satellite positioning system having a constellation of satellites, said receiver adapted for acquiring data from a satellite related to the position of the mobile terminal, the mobile terminal further comprising a MEMS device, characterized in that the MEMS device is adapted for detecting an absolute value of a speed of the mobile terminal and for providing said value to the receiver; and in that the receiver is provided with means for computing, by or for the receiver, a corresponding value for vector components of the speed of the mobile terminal.

Another object of the present invention is that of providing a method for data acquisition by a receiver in a user mobile terminal in a satellite positioning system having a constellation of satellites, the mobile terminal further comprising a MEMS device said method comprising the steps of acquiring data from a satellite related to a position of the mobile terminal, the method further characterized by the steps of:

detecting, by said MEMS, an absolute value of the speed of the mobile terminal and providing it to the receiver; and computing, by or for said receiver, a corresponding value for vector components of the speed of the mobile terminal.

These and further advantages of the present invention are explained in more detail in the following description as well as in the claims with the aid of the accompanying drawing.

BRIEF DESCRIPTION OF THE DRAWINGS

The single FIGURE is a schematic and simplified representation of a positioning satellite and a mobile terminal for which positioning needs to be performed.

EXAMPLES OF A PREFERRED EMBODIMENT

The present invention proposes the use of a MEMS device in order to obtain the absolute value of the speed of the mobile terminal U (speed of the user). MEMS devices are well known to the persons with ordinary skill in the art. A typical MEMS, made on a silicon substrate, includes mechanical parts which are used for sensing different phenomena in the environment, and electronic parts which are used for processing the information obtained by such sensing activity of the mechanical parts. One of the known applications of MEMS is in obtaining information on the so called inertial movements of a mobile object. The present invention proposes to take advantage of this property of the MEMS devices in a new arrangement and method implemented within a mobile terminal in order to reduce complex processing of data in a mobile terminal within a positioning system.

In the FIGURE, a satellite S is shown. It is assumed that the satellite S pertains to a constellation of satellites in a satellite positioning system wherein the rest of the satellites of the constellation are not shown for the sake of simplicity of description. The speed of satellite S is shown by means of speed vector components $V_{sx}$, $V_{sy}$ and $V_{sz}$. A user mobile terminal U is within the line of sight of satellite S. The mobile terminal U has a receiver R for receiving information relative to the positioning process of the mobile unit U. The speed of the mobile unit is represented by speed vector components $V_{ux}$, $V_{uy}$ and $V_{uz}$.

In order to carry out the solution proposed by the present invention, the first operation is preferably to select and sort the satellites S according to their elevation angle. This operation is optional but an advantage of this option is that selecting satellites with high elevation allows the acquisition process to start with satellites presenting a relatively low Doppler.

Let $(X_s, Y_s, Z_s)$ denote the satellite position in the ECEF referential (ECEF stands for Earth Centered Earth Fixed, which is a known reference in positioning systems) computed in a known manner, for example by an approximate knowledge of the time plus the ephemeris of the satellite or the almanacs or information retrieved from an assistant unit for example in an AGPS system.

Let $(X_u, Y_u, Z_u)$ denote the approximate position of the user. This position can be known also by means of conventional techniques, for example from a previous fix data or received from an assistant unit.

The elevation angle of the satellite is given by the following known expression:

$$Elev\ Angle = \frac{\pi}{2} - A\cos(\vec{u} \cdot \vec{v});$$

where $\vec{u}$ is the unitary vector between the user and the satellite and $\vec{v}$ is the position vector of the user and these factors are expressed as follows:

$$\vec{u} = \frac{1}{\sqrt{(X_s - X_u)^2 + (Y_s - Y_u)^2 + (Z_s - Z_u)^2}} \begin{vmatrix} X_s - X_u \\ Y_s - Y_u \\ Z_s - Z_u \end{vmatrix}$$

$$\vec{v} = \frac{1}{\sqrt{X_u^2 + Y_u^2 + Z_u^2}} \begin{vmatrix} X_s \\ Y_s \\ Z_s \end{vmatrix}$$

Once the elevation angle of each visible satellite is obtained and the satellites are sorted from the highest elevation to the lowest, the acquisition process can be started preferably in this same order.

The speed of the satellite is $\vec{V}_s = (V_{sx}, V_{sy}, V_{sz})$ the induced Doppler, as is known in the art, is expressed as:

$$\frac{f_0}{c}(\vec{V}_s \cdot \vec{u}),$$

where $f_0$ is the central frequency, 1576 MHz in the case of GPS and c is the speed of light.

In the acquisition process the frequency search may then be carried out taking into account the satellite Doppler information, however an uncertainty on the user Doppler effect is still to be overcome. This means that the frequency search has to take into account deviations due to the user Doppler effect which is given by the following expression:

$$\frac{f_0}{c}\vec{V}_s \cdot \vec{u},$$

where $\vec{V}_u$ is the user speed.

As already mentioned in an example provided further above, in a conventional system the acquisition process would then be required for example over 11 frequency slots which involves a substantially high computation load.

According to the present invention, the receiver is provided with a MEMS device M being able to detect the absolute value (module) of the speed of the mobile terminal which is expressed as follows:

$$\hat{V} = \sqrt{V_{ux}^2 + V_{uy}^2 + V_{uz}^2}$$

This is a known property in MEMS devices and it is a relatively simple operation because the detection of the module of the speed of the mobile terminal does not involve detection of direction of the vector components of the speed.

The detected module of the speed of the mobile terminal U is then delivered to the receiver R.

The receiver R further acquires data from the satellites of which the mobile terminal U is in the line of sight. In order to do so, when a satellite i has been acquired (i being an integer representing the number of the satellite in the constellation), the pseudo range towards the satellites can be estimated, and the corresponding Doppler factor can also be estimated. This Doppler factor is directly related to the frequency slot in which the signal from the satellite has been acquired. With the above information acquired, the following equation can then be written:

$$\frac{(X_{S_i} - X_u)}{\sqrt{(X_{S_i} - X_u)^2 + (Y_{S_i} - Y_u)^2 + (Z_{S_i} - Z_u)^2}} \cdot V_{ux} +$$

$$\frac{(Y_{S_i} - Y_u)}{\sqrt{(X_{S_i} - X_u)^2 + (Y_{S_i} - Y_u)^2 + (Z_{S_i} - Z_u)^2}} \cdot V_{uy} +$$

$$\frac{(Z_{S_i} - Z_u)}{\sqrt{(X_{S_i} - X_u)^2 + (Y_{S_i} - Y_u)^2 + (Z_{S_i} - Z_u)^2}} \cdot V_{uz} =$$

$$\frac{c}{f_0}\left(SF_i - \vec{V}_{S_i} \cdot \vec{u}_i + \frac{\Delta f}{c}\right)$$

where X, Y and Z refer to respective positions of the satellite and the mobile terminal and V to the respective speed thereof;

$f_0$ is the central frequency of the received signal, e.g. 1576 MHz for GPS L1, $\vec{u}$ is the unitary vector between the user mobile terminal U and the satellite S $\Delta f$ is the frequency error of the receiver R.

$SF_i$ is the frequency slot in which the satellite has been acquired. This frequency slot corresponds to the frequency difference between the receiver clock of the mobile terminal and the satellite transceiver clock.

The above equation can then be re-written in the following simplified form:

$$\vec{V}_u \cdot \vec{u}_i - \frac{\Delta f}{f_0} = \frac{c}{f_0}(SF_i - \vec{V}_{S_i} \cdot \vec{u}_i)$$

In this equation there are four unknowns: three of them being the three vector components of the user speed $\vec{V}_u$, and the forth one being the frequency error $\Delta f$ of the receiver R.

Therefore, supposing that thee satellites have been acquired (1<i<3) and that a MEMS device M is able to provide the module of the user speed to the receiver R, the latter is then able to establish a system of four equations with four unknowns; namely:

$$\begin{cases} \vec{V}_u \cdot \vec{u}_1 - \frac{\Delta f}{f_0} = SF_1 - \vec{V}_{S_1} \cdot \vec{u}_1 \\ \vec{V}_u \cdot \vec{u}_2 - \frac{\Delta f}{f_0} = SF_2 - \vec{V}_{S_2} \cdot \vec{u}_2 \\ \vec{V}_u \cdot \vec{u}_3 - \frac{\Delta f}{f_0} = SF_3 - \vec{V}_{S_3} \cdot \vec{u}_3 \\ \sqrt{V_{ux}^2 + V_{uy}^2 + V_{uz}^2} = \hat{V}_u \end{cases}$$

where $\hat{V}_u$ is the module of the user speed estimated by a MEMS device and numbers 1, 2 and 3 represent each one of the three satellites.

This above system of equations can be solved by any known method, for example by a non linear method of least square criteria minimization (gradient, Levenberg Marquardt etc . . . ).

The advantage of the solution provided by the present invention is that after having solved the above system of equations, the receiver knows the exact speed of the user and can then acquire the other satellites without any uncertainty on the frequency slot to test. This leads to a substantial improvement of the time required for completing the acquisition process of the satellite constellation as well as the time for computing a position of the user.

It is to be noted that the procedure can be further optimized for the case where two satellites are acquired. This may be the case in applications where the vertical speed is null for example in the case where the mobile terminal is in a car moving on a road, with a pedestrian, in a plane en route, etc. In such cases, the method described above can be used by setting the third component of the user speed to zero, thus the system of equation becomes for example as follow:

$$\begin{cases} \vec{V}_u \cdot \vec{u}_1 - \frac{\Delta f}{f_0} = SF_1 - \vec{V}_{S_1} \cdot \vec{u}_1 \\ \vec{V}_u \cdot \vec{u}_2 - \frac{\Delta f}{f_0} = SF_2 - \vec{V}_{S_2} \cdot \vec{u}_2 \\ \vec{V}_u \cdot [0 \ 0 \ 1] = 0 \\ \sqrt{V_{ux}^2 + V_{uy}^2 + V_{uz}^2} = \hat{V}_u \end{cases}$$

In either one of the alternatives described above or in cases where more than three satellites are acquired, once the vector components of the speed of the user have been found, the overall speed is consequently found. With this information is then possible to predict a respective frequency slot corresponding to another satellite. This can done using the following relationship:

$$SF_i = f_0 + \Delta f + \frac{f_0}{c}(\vec{V}_{S_i} + \vec{V}_u) \cdot \vec{u}$$

In the above example of preferred embodiment it is assumed that once the value of the module of the speed of the user is provided to the receiver, the subsequent computation of the vector components of the speed is done by the receiver. However, it is to be noted that the example is not be construed in a limiting manner and the scope of the invention covers also cases wherein the subsequent computation operations are processed in an auxiliary unit, not included in the receiver itself, and performing the operations for the receiver.

The solution proposed by the present invention has the important advantage that by obtaining the correct speed components of the user mobile terminal U and with the knowledge of the speed of the satellite, the receiver can deduce the exact frequency slot for each and every other satellite in view. In this manner, the receiver needs to test only one frequency slot instead of 11 slots as described above in relation to the conventional methods. This leads to a substantial reduction in complexity.

The invention claimed is:

1. A receiver (R) for use in a user mobile terminal (U) in a satellite positioning system having a constellation of satellites (S), said receiver (R) adapted for acquiring data from a satellite related to the position of the mobile terminal (U), characterized in that the receiver is provided with means for computing a speed of the mobile terminal based on information obtained from acquiring at least two satellites, wherein the means for computing a speed of the mobile terminal comprise a MEMS device (M), adapted for detecting an absolute value ($\hat{V}_u$) of a speed of the mobile terminal (U) and for providing said value to the receiver (R); and in that the receiver is provided with means for computing, by or for the receiver (R), a corresponding value for vector components ($V_{ux}$, $V_{uy}$, $V_{uz}$) of the speed of the mobile terminal.

2. A receiver according to claim 1 comprising means for deducing a user Doppler information related to other satellites of the constellation based on said speed of user mobile terminal (U) so as to enable acquisition of signals from said other satellites using said Doppler information.

3. A receiver according to claim 1, wherein the information on the vector components ($V_{ux}$, $V_{uy}$, $V_{uz}$) of the speed of the mobile terminal is used in order to obtain a Doppler effect value related to said mobile terminal (U).

4. A receiver according to claim 1, wherein the information on the vector components ($V_{ux}$, $V_{uy}$, $V_{uz}$) of the speed of the mobile terminal is obtained from the following system of equations:

$$\vec{V}_u \cdot \vec{u}_i - \frac{\Delta f}{f_0} = \frac{c}{f_0}(SF_i - \vec{V}_{s_i} \cdot u_i)$$

where i is an integer number greater than 1;
$f_0$ is the central frequency of a signal received from the satellite;
$\vec{u}$ is a unitary vector between the user mobile terminal U and the satellite S;
$\Delta f$ is a frequency error of the receiver R;
$SF_i$ is a frequency slot in which a satellite has been acquired;
c the speed of light; and
$\vec{V}_u$ is the speed of the user mobile terminal U.

5. A method for acquiring a satellite signal in a user mobile terminal (U) in a satellite positioning system having a constellation of satellites (S) comprising the steps of:

acquisition of at least two satellites (S);
obtaining an absolute value ($\hat{V}_u$) of the speed of the mobile terminal (U), by means of a MEMS device (M), based on the information retrieved with the two said satellites signals;
deduction of a user Doppler information related to other satellites of the constellation using said speed of said user mobile terminal (U); and
acquisition of signal of other satellites in the constellation using said user Doppler information.

6. The method of claim 5 wherein the absolute value of the speed of the user mobile terminal is used for obtaining corresponding values for vector components ($V_{ux}$, $V_{uy}$, $V_{uz}$) of the speed of the user mobile terminal (U).

7. The method of claim 6, comprising the step of using the information on the vector components ($V_{ux}$, $V_{uy}$, $V_{uz}$) of the speed of the mobile terminal for obtaining a Doppler effect value related to said mobile terminal (U).

8. The method of claim 7, wherein the information on the vector components ($V_{ux}$, $V_{uy}$, $V_{uz}$) of the speed of the mobile terminal is obtained from the following system of equations:

$$\vec{V}_u \cdot \vec{u}_i - \frac{\Delta f}{f_0} = \frac{c}{f_0}(SF_i - \vec{V}_{s_i} \cdot u_i)$$

where i is an integer number greater than 1;
$f_0$ is the central frequency of a signal received from the satellite;
$\vec{u}$ is a unitary vector between the user mobile terminal U and the satellite S;
$\Delta f$ is a frequency error of the receiver R;
$SF_i$ is a frequency slot in which a satellite has been acquired;
c the speed of light; and
$\vec{V}_u$ is the speed of the user mobile terminal U.

9. The method of claim 5 wherein before the step of acquiring at least two satellites, the following steps are performed:
obtaining an elevation angle of the satellites (S) in a visibility with respect to the mobile terminal
sorting the satellites (S) according to their elevation angle
starting the acquisition process with the satellite having the highest elevation value.

* * * * *